June 6, 1950     C. P. DAVIS ET AL     2,510,083
TOOL GUIDE
Filed March 15, 1945     2 Sheets-Sheet 2
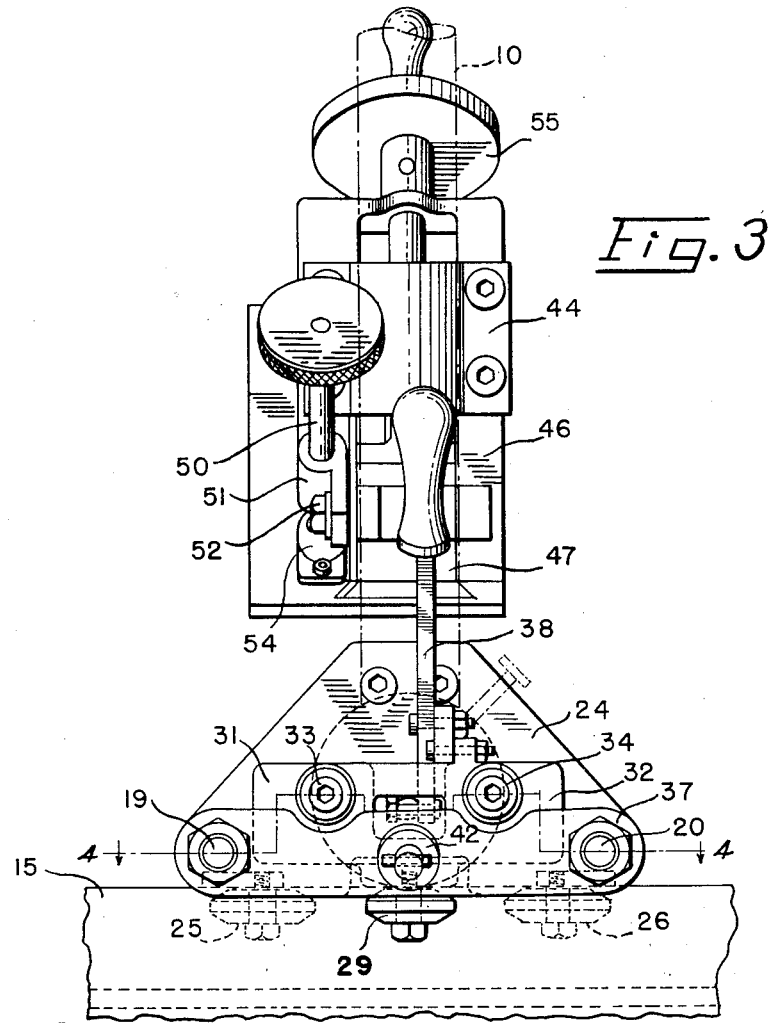
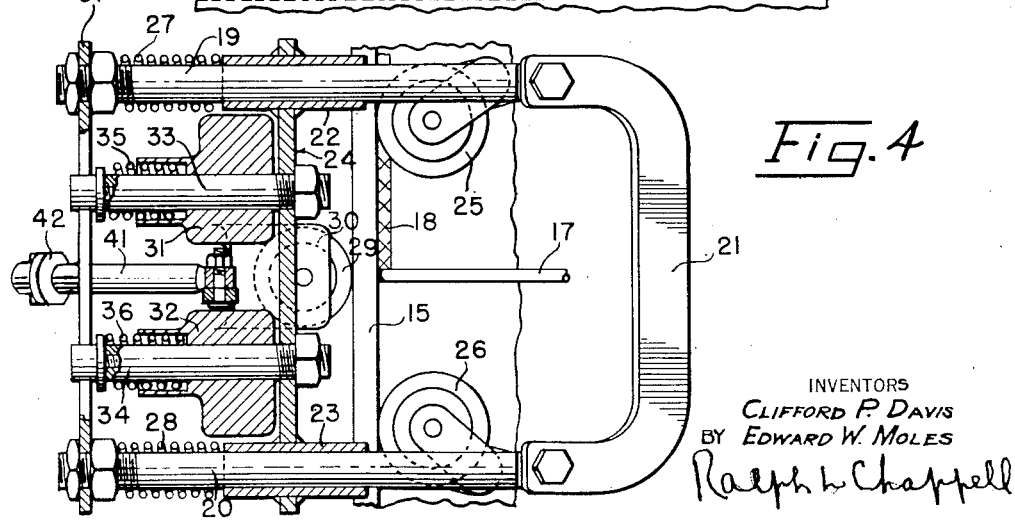
INVENTORS
CLIFFORD P. DAVIS
BY EDWARD W. MOLES
Ralph L. Chappell Patented June 6, 1950

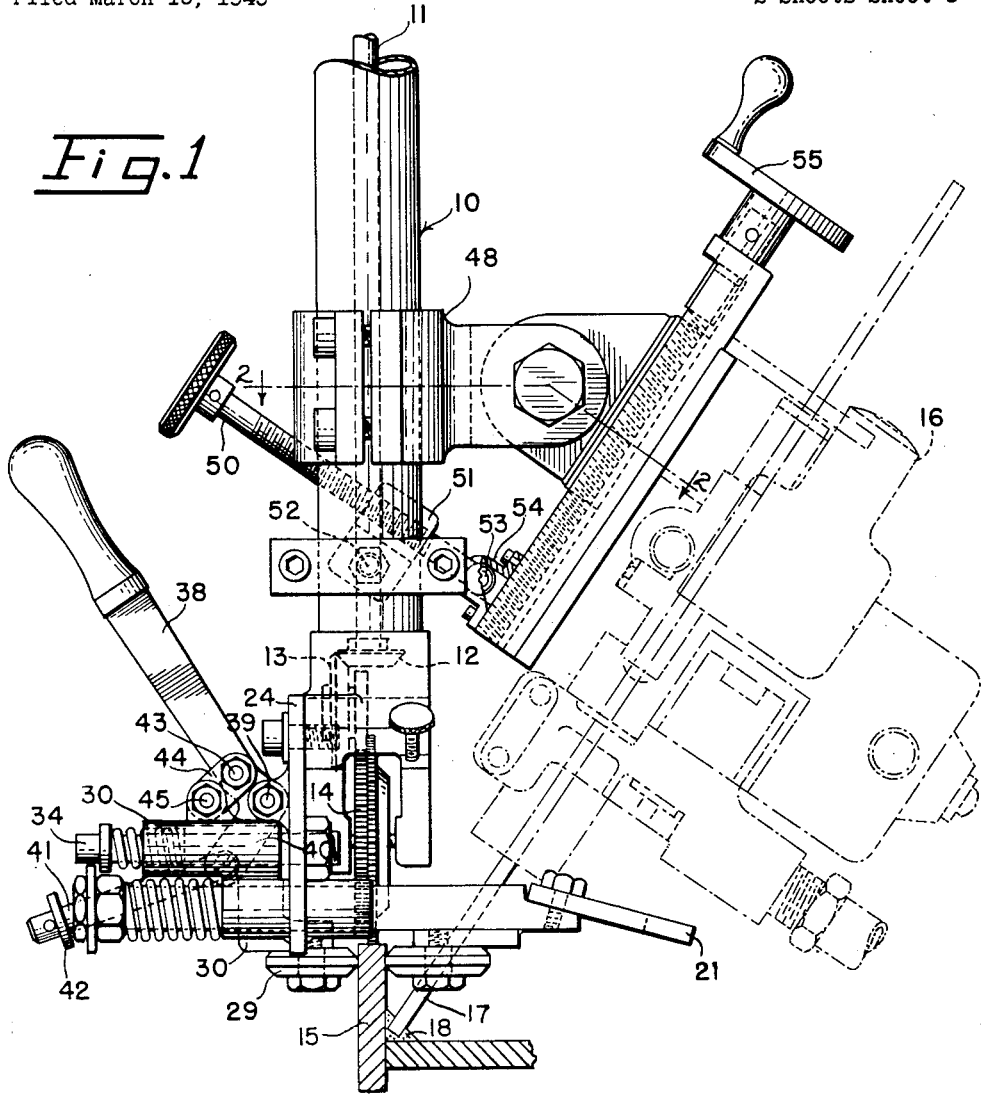

2,510,083

UNITED STATES PATENT OFFICE 2,510,083

TOOL GUIDE

Clifford P. Davis, United States Navy, Brooklyn, N. Y., and Edward W. Moles, Birmingham, Ala.

Application March 15, 1945, Serial No. 582,959

5 Claims. (Cl. 113—59)

(Granted under the act of March 3, 1883, as amended April 30, 1928; 370 O. G. 757)

This invention relates to carriages for supporting tools for movement over work surfaces and more particularly for guiding welding apparatus at a uniform rate along a straight or contoured path.

In performing welding operations whether by a gas flame or by electric welding electrodes, it is important to provide a tool carriage and suitable guiding means therefor whereby the tool may be guided at a uniform rate along a prescribed course and thereby produce a standard uniformly and neatly finished weld.

The present invention provides a tool holder of the above character and is particularly adapted to welding flanges or reenforcement members around circular or elliptical openings as in bulkheads or floor plates of ship structures; however, it will be apparent that any desired straight or curved weld for any purpose may be made.

It is an object of the present invention to provide a tool carriage which will accommodate a standard attachment for the usual welding tool or welding machine and which is adapted through suitable control members and linkages to permit ready attachment to the detachment from the carriage guiding rail.

An additional object of the present invention is to provide an improved guide rail supported carriage which may be employed as an accessory to the usual welding machine and which guides and controls the welding electrode during the travel of the carriage and retains it in proper set relation to the work whereby a uniformly smooth and finished appearing weld may be produced.

Another object of this invention is to provide a device of the above character having means whereby the device may readily be removed from the guide rail and quickly be replaced in desired alignment.

An additional object of this invention is to provide a carriage which is sturdy, simple to operate, embodies a minimum number of parts and may be operated with a minimum amount of mechanical skill and attention from the operator.

Other objects and advantages will be hereinafter more fully described and for a complete understanding of the nature, scope and characteristics of this invention reference may now be had to the following description and accompanying drawings, in which latter Fig. 1 is a side elevation of one embodiment of the present invention;

Fig. 2 is a top plan view taken on a line substantially corresponding to line 2—2 of Fig. 1;

Fig. 3 is a side elevation of the embodiment shown in Fig. 1 with broken away portions indicated by dot and dash lines; and Fig. 4 is a top plan view partially in section taken along a line substantially corresponding to line 4—4 of Fig. 3.

Referring to the drawings in detail, the embodiment illustrated is shown secured to a vertically depending arm of the usual polygraph welding machine which may be of any standard type such as is employed in the well known Union-melt welding process to which the present invention is adapted. This arm 10 may house a rotatable drive shaft 11 and through the usual bevel gears 12 and 13 may drive a knurled drive wheel 14. The arm 10 and the welding device supported thereon as hereinafter described is thus carried along the guide rail 15 during operation.

The welding electrode automatic feeding attachment shown in dot and dash lines in Fig. 1 forms no part of the present invention but feeds an electric welding rod 17 to the work so that the weld 18 is thereby formed.

It will apparent that if properly guided a weld may be produced along any controlled contoured line wherein the shape of the structure includes an upstanding portion such as the rail or track 15 so as to provide a guide surface for the driving wheel of the machine to travel on; or where no such rail is present as a part of the work a sufficient number of repetitions of the same shape may be desired to warrant the construction of a separate template track for the job.

In order to guide the driving wheel 14 along the top of the track the present invention provides an improved work engaging guide which is provided with oppositely disposed rail engaging wheels or rollers. These rollers may be separated so as to permit the carriage to be installed and are normally urged together by springs to engage the sides of the rail. As best shown in Fig. 4 the guide mechanism comprises a U-shaped frame formed by spaced parallel legs 19 and 20 connected at one end by a flat inclined transverse member 21. The legs 19 and 20 pass through bearing sleeves 22 and 23 which are attached to a guide wheel support plate 24.

The legs 19 and 20 are each provided with individual track engaging guide rollers 25 and 26 respectively and, by means of springs 27 and 28 these rollers are normally urged against one side of the track 15. The opposite side of the track 15 is engaged by a similar guide roller 29 equidistantly positioned between the rollers 25 and 26 and supported on a movable slide 30 which is provided with upstanding bushing portions 31 and 32 capable of reciprocation upon guide studs 33 and 34. Two springs 35 and 36 urge the slide 30 with roller 29 toward the track so that the roller bears resiliently against the side of the track 15.

A bar 37 bridges the far ends of the legs 19 and 20 as shown and may be secured thereto in any desired manner.

It will be noted that in the construction just described the guide roller support plate 24 remains fixed in parallel alignment to the track 15 while the rollers 25 and 26 on the U-shaped frame 19, 20 and 21 may move transversely through the bearings shown so as to accommodate lateral displacement of the rollers as required by the track contour. Likewise, the single roller 29 is resiliently supported by means of the inner guide wheel slide and stud engaging bushings for transverse reciprocating movement so as to conform to the contour of the track 15.

The means above described for urging the guide wheels into engagement with the track may be operated together so as to be withdrawn in unison from engagement with the track by means of an operating lever 38 the lower end of which is of the dotted line contour shown in Fig. 1 and is pivoted at 39. It will be noted that when the outer end of handle 38 is depressed the terminal portion 40 draws spring compressing arm 41 to the right causing its head 42 to bear against the spreader plate 37 compressing the springs 27 and 28 and thus disengaging wheels 25 and 26 from the right hand side of the track.

Simultaneously with the above the downward motion of the lever 38 moves pivot 43 downwardly and by toggle action acting through link 44 connected to joint 45 causes the inner wheel slide member 30 to be withdrawn carrying with it the inner guide wheel 29. As slide 30 is withdrawn from the track springs 35 and 36 are compressed.

By the above arrangement it will be noted that the guide wheel supporting portions of the carriage may be simultaneously and uniformly separated by downward movement of the operating lever and it will be obvious that when released this lever automatically will be forced upwardly and the track engaging guide wheels will draw together until the wheels fully engage the track.

As shown by dotted lines in Figs. 1 and 2 an electric welding electrode feeding device 16 may be supported so as to feed an electrode 17 into the work as the welding process continues. If desired this machine may be mounted upon a guideway 46 (Fig. 2) which may be dovetailed as shown to a member 47 and secured to the depending arm 10 by means of a hinged and adjustable clamp 48.

In conjunction with the above support a hand operated screw adjustment 50 may be provided threaded through a nut 51 pivoted at 52 as shown and having an enlarged end 53 socketed in a suitable clip 54. It will be apparent that the angle of the electrode feeding motor may be varied as desired by manual adjustment of the threaded stem 50.

It will be apparent that by operation of a hand wheel 55 the electrode feeding device may be initially set and will thereafter operate in the usual manner.

Though the present invention is shown applied to an electric welding apparatus, yet it is equally capable of use in other welding and tool supporting operations as will be apparent to anyone skilled in the art.

From the foregoing description it will be apparent to those skilled in the art that various modifications thereof may be made without departing from the spirit and scope of this invention and it is desired, therefore, that the same be limited only by the scope of the prior art and the appended claims.

The invention described herein may be manufactured and used by or for the Government of the United States of America for governmental purposes without the payment of any royalties thereon or therefor.

Having thus described the invention, what is claimed and desired to be secured by Letters Patent is:

1. Torch guiding apparatus comprising a tracing device having a power-driven traction wheel adapted to run on the top edge of a template extending perpendicularly from a metal surface, a template follower carried by the tracing device including a member fixed to the tracing device adjacent one side of the traction wheel, a second member slidably connected to the fixed member and extending to the opposite side of the traction wheel, a single guide roller carried by one of the members adapted to engage one side of the template, spaced guide rollers carried by the other member and adapted to engage the opposite side of the template, means acting on the members to urge the spaced guide rollers toward the single guide roller, and a torch connected to the tracing device to move therewith and extending into the space provided by the spaced guide rollers.

2. Metal welding apparatus comprising a tracing device having a power-driven traction wheel adapted to run on the top edge of a template extending vertically from a metal surface, a template follower mounted on the tracing device including a base block located at one side of the traction wheel, a single guide roller on said base block adapted to bear against one side of the template, a frame slidably mounted on the base block and extending about the traction wheel to the opposite side thereof, spaced guide rollers on the frame adapted to bear against the opposite side of the template, a welding instrument connected to the tracing device to move therewith and extending into the space provided by the spaced guide rollers, and resilient means for urging the base block and frame together to maintain the rollers against the opposite sides of the template.

3. Guiding apparatus of the class described comprising a tracing device having a power-driven traction wheel adapted to run on the top edge of a template extending perpendicularly from a metal surface, a template follower carried by the tracing device including a member fixed to the tracing device adjacent one side of the traction wheel, a second member slidably connected to the fixed member and extending to the opposite side of the traction wheel, a single guide roller carried by one of the members adapted to engage one side of the template, spaced guide rollers carried by the other member and adapted to engage the opposite side of the template, means acting on the members to urge the spaced guide rollers toward the single guide roller, and metal fusion means connected to the tracing device to move therewith and extending into the space provided by the spaced guide rollers.

4. Metal welding apparatus comprising a tracing device having a power-driven traction wheel adapted to run on the top edge of a template extending vertically from a metal surface, a template follower mounted on a tracing device including a base member located at one side of the traction wheel, a single guide roller carried by said base member and adapted to bear against one side of the template, a frame slidably mounted on the base member and extending about the traction wheel to the opposite side thereof, spaced guide rollers on the frame adapted to bear against the opposite side of the template, a welding instrument connected to the tracing device to move therewith and extending into the space provided by the spaced guide rollers, and resilient means for urging the base member and frame together to maintain the rollers against the opposite sides of the template.

5. Guiding apparatus of the class described, comprising a housing carrying a power-driven traction wheel adapted to run on the top edge of a vertical template, a downwardly extending bracket rigidly secured to said housing, a pair of guide sections slidably mounted on said bracket for horizontal movement toward and from each other in a direction laterally of said template, a plurality of rollers carried by said guide sections for rolling contact with opposite side surfaces of the template, resilient means reacting between said bracket and said guide sections to urge the latter towards each other, and mechanism for forcing said sections apart to retract said rollers from the template, said mechanism comprising a lever pivoted between its ends upon said bracket and having its working end connected to one of said guide sections, and a link connected in toggle fashion between said lever and the other of said sections.

CLIFFORD P. DAVIS.
EDWARD W. MOLES.

REFERENCES CITED

The following references are of record in the file of this patent:

UNITED STATES PATENTS

| Number | Name | Date |
|---|---|---|
| 385,356 | Johnson | July 3, 1888 |
| 514,752 | Humphrey | Feb. 13, 1894 |
| 1,324,005 | Bucknam | Dec. 2, 1919 |
| 1,539,383 | Bienenstok | May 26, 1925 |
| 1,818,859 | McIlvin | Aug. 11, 1931 |
| 1,860,037 | Krebs | May 24, 1932 |
| 1,983,321 | Stephens et al. | Dec. 4, 1934 |
| 2,018,259 | Hartley | Oct. 22, 1935 |
| 2,270,242 | Anderson | Jan. 20, 1942 |

FOREIGN PATENTS

| Number | Country | Date |
|---|---|---|
| 230,571 | Great Britain | Mar. 19, 1925 |
| 803,794 | France | July 20, 1936 |
| 230,098 | Germany | 1911 |
| 283,684 | Germany | 1915 |
| 488,907 | Germany | Jan. 9, 1930 |
| 642,217 | Germany | Feb. 25, 1937 |